United States Patent [19]

AbuJudom, II

[11] Patent Number: 4,584,838

[45] Date of Patent: Apr. 29, 1986

[54] APPARATUS FOR PROVIDING RELATIVELY DRY, OIL FREE COMPRESSED INSTRUMENT AIR

[75] Inventor: David N. AbuJudom, II, Brookfield, Wis.

[73] Assignee: Johnson Service Company, Milwaukee, Wis.

[21] Appl. No.: 690,315

[22] Filed: Jan. 10, 1985

[51] Int. Cl.[4] ............................................. F25B 9/02
[52] U.S. Cl. ........................................... 62/5; 62/87; 62/401
[58] Field of Search .......................... 62/5, 86, 87, 401

[56] References Cited

U.S. PATENT DOCUMENTS

| | | | |
|---|---|---|---|
| 2,861,431 | 11/1958 | Van Deemter | 62/5 |
| 3,090,208 | 5/1963 | Munakata | 62/5 |
| 3,775,988 | 12/1973 | Fekete | 62/5 |
| 3,815,375 | 6/1974 | Inglis | 62/5 |
| 3,858,403 | 1/1975 | Dunn | 62/5 |
| 3,889,484 | 6/1975 | Vander Horst et al. | 62/5 |
| 3,973,396 | 8/1976 | Kronogard | 62/5 |

Primary Examiner—Ronald C. Capossela
Attorney, Agent, or Firm—Larry L. Shupe; Joseph J. Jochman, Jr.; John Phillip Ryan

[57] ABSTRACT

An apparatus for providing relatively dry, oil free compressed instrument air includes a first compressor for receiving air at ambient temperature and pressure and compressing it to an elevated pressure. A cooler is provided for cooling the compressed air while a vortex directs its cold fraction discharge air to a second compressor. A heat exchanger is disposed intermediate the cooler and the vortex tube for transferring heat from the cooled, compressed air to the cold fraction discharge air. An air-water separator may be disposed between the vortex tube inlet and the heat exchanger for removing any condensed water from the compressed air. The second compressor receives the cold fraction discharge air and generates a supply of instrument air at a pressure not in excess of 25 p.s.i.g. and which has a dewpoint below the freezing temperature of water. A method for producing relatively dry, compressed instrument air is also disclosed.

1 Claim, 4 Drawing Figures

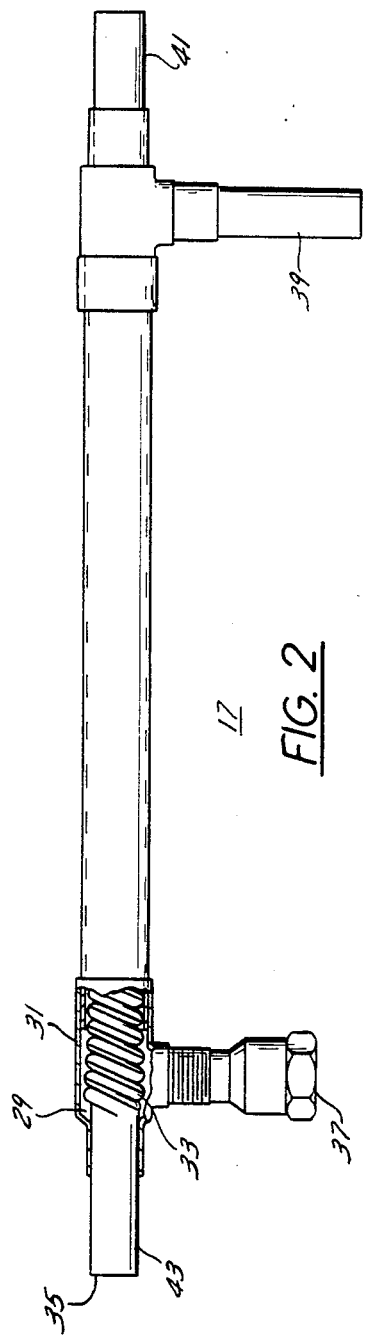
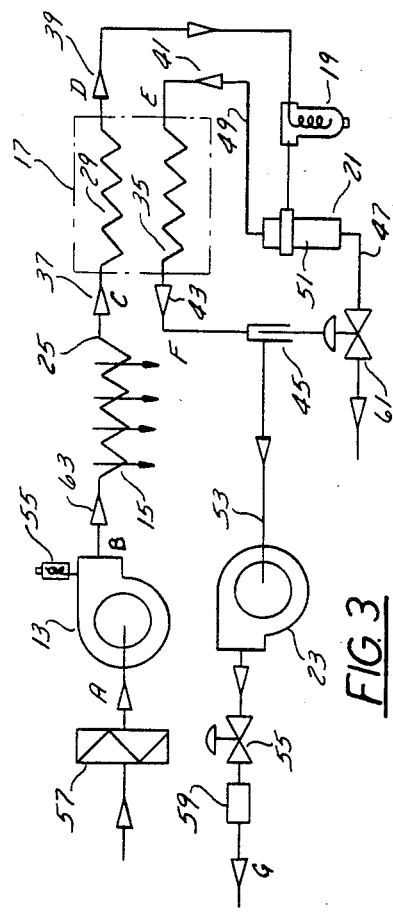

APPARATUS FOR PROVIDING RELATIVELY DRY, OIL FREE COMPRESSED INSTRUMENT AIR

This invention relates generally to the removal of moisture from air and more particularly, to an apparatus and method utilizing a first compressor, a cooler, a heat exchanger, a vortex tube and a second compressor for providing compressed, instrument-quality air which has a dewpoint below the freezing temperature of water.

In pneumatic instrumentation and control systems presently in wide use, it is frequently desirable to have available a source of air compressed to a pressure of about 20-25 p.s.i.g. for effecting pneumatic logic control and for positioning pneumatic valve and damper actuators and the like. Such systems are used in, for example, industrial and commercial buildings where a pneumatic scheme controls aspects of the heating, ventilating and air conditioning (HVAC) system. The presence of moisture in the supply of instrument air may have a deleterious effect upon the system since such moisture can corrode or obstruct parts of the control or actuator apparatus. Additionally, damper and valve actuators and the like may be located in a building adjacent outdoor air vents where they will be subjected to temperatures approximating the freezing temperature of water. Ice particles resulting from the presence of significant moisture within the instrument air supply will have an adverse effect upon the performance of the pneumatic control system.

One type of system used for moisture removal is shown in U.S. Pat. No. 3,889,484 and includes a gas drying system having a dual path heater exchanger, a first path of which receives air at an elevated inlet pressure and directs it to a vortex tube. The vortex tube cold fraction is directed to the second path for first path cooling and is later combined with the hot fraction to provide drier air at a reduced working pressure. Yet another example of a moisture removing apparatus is shown and described in U.S. Pat. No. 3,815,375. The system disclosed therein uses compressed air source together with a double pass, counterflow heat exchanger, an air-water separator and a vortex tube. There is included a temperature sensor to maintain the temperature of the air-water mixture between 33° F. and 36° F. which becomes the input flow to the airwater separator. Other examples of moisture removal apparatus are shown in U.S. Pat. Nos. 2,861,431 and 3,858,403.

While these apparatus have heretofore been generally satisfactory for the partial removal of moisture from pretreated or tempered air, they have failed to appreciate the manner in which air at ambient pressure and temperature may be processed to provide instrument air at a pressure generally not in excess of 25 p.s.i.g. and which has a dewpoint below the freezing temperature of water.

SUMMARY OF THE INVENTION

In general, an apparatus for providing relatively dry, oil free compressed instrument air includes a first compressor for receiving air at ambient temperature and pressure and compressing it to an elevated pressure. A cooler is provided for cooling the compressed air while a vortex directs its cold fraction discharge air to a second compressor. A heat exchanger is disposed intermediate the cooler and the vortex tube for transferring heat from the cooled, compressed air to the cold fraction discharge air. An air-water separator may be disposed between the vortex tube inlet and the heat exchanger for removing any condensed water from the compressed air. The second compressor receives the cold fraction discharge air and generates a supply of instrument air at a pressure not in excess of 25 p.s.i.g. and which has a dewpoint below the freezing temperature of water. A method for producing relatively dry, compressed instrument air is also disclosed.

It is an object of the inventive apparatus and method to provide a supply of instrument air at a pressure suitable for use in pneumatic control systems and which has a dewpoint below the freezing temperature of the water at working pressure.

Another object of the present invention is to permit the production of instrument quality, substantially oil free compressed air which has a relative humidity less than about 10% at room ambient temperature and pressure.

Still another object of the present invention is to permit the production of a supply of compressed instrument air which has less than about 0.0014 pounds of water per pound of dry air.

Yet another object of the present invention is to permit the production of instrument quality air by the utilization of a pair of compressors, a cooler, a vortex tube and a heat exchanger for providing a supply of compressed air having a dewpoint below the freezing temperature of water. How these and other objects are accomplished will become more apparent from the detailed description thereof taken in conjunction with the accompanying drawing.

DESCRIPTION OF THE DRAWING

FIG. 2 is a side elevation view of a heat exchanger useful in the apparatus of FIG. 1 and with portions shown in dotted outline, other portions shown in cross-section and yet other portions broken away;

FIG. 3 is a schematic diagram of the apparatus of FIG. 1, and;

DETAILED DESCRIPTION OF THE PREFERRED EMBODIMENTS

Figure 1:
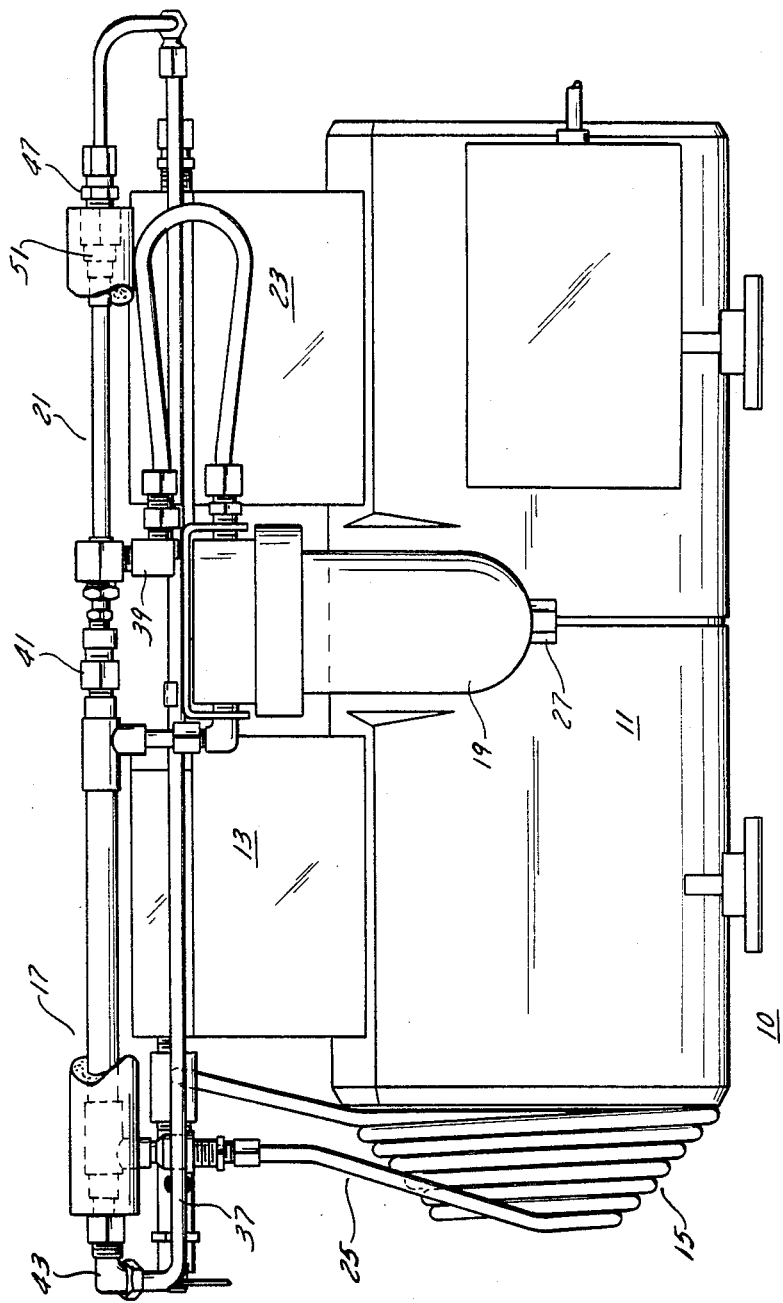
FIG. 1 is a side elevation view of a preferred embodiment of the apparatus of the present invention useful for carrying out the inventive method and with portions shown broken away and yet other portions shown in dotted outline.

Referring to FIG. 1, the apparatus 10 is shown to include an electric drive motor 11, a first compressor 13, a cooler 15, a heat exchanger 17, an air-water separator 19, a vortex tube 21 and a second compressor 23. The first and second compressors 13, 23 may advantageously be coupled to the same motor drive shaft and such motor 11 and compressors 13, 23 combinative units are available from, for example, Thomas Industries, Inc. of Sheboygan, WI, their Model 807 series, twin head model. The cooler 15 may be embodied of any one of a wide variety of types. However, a satisfactory cooler 15 may be constructed in one embodiment from a 5 ft. length of one quarter inch copper tubing coiled to define a truncated cone. The cooler 15 is preferably configured to effect a degree of heat removal from the air compressed by the first compressor 13 such that the air at the output end 25 of the cooler 15 is brought to a temperature within about 5°-6° F. of the ambient temperature of the air entering the compressor 13. This reduction in temperature of the air passing through the cooler 15 will be substantially isobaric; that is, the pressure of the compressed air being discharged from the cooler 15 will be essentially equal to that of the air entering the cooler 15 from the first compressor 13. It should also be noted that while the separator 19 may be located as shown in FIG. 1, the cooler 15 will be made more effective if the separator 19 is mounted in a position such that effluent water discharged from the separator port 27 may be allowed to drip upon the coils forming cooler 15.

Referring additionally to FIG. 2, while the heat exchanger 17 may be embodied as any one of several design types, a preferred heat exchanger 17 is of the dual path, counterflow type which includes a generally annular outer first path 29 occurring between the tubing walls 31 and 33 of the outer and inner conductors respectively and an interior, concentric second path 35 enclosed by the tube wall 33 of the inner conductor. The outer conductor wall 31 may be formed of smooth copper tubing while the inner conductor may be formed of, for example, copper tubing having a wall defining a spiral groove configuration. The interior diameter of the outer conductor wall 31 is preferably selected to be only slightly greater than the maximum exterior diameter of the spiral wall 33. Air flowing in the first path 29 will thereby be caused to move spirally in the interstitial space defined between the outer wall 31 and the inner wall 33. The first path 29 also includes an inlet port 37 for connection to the cooler output end 25 and an outlet port 39 for connection to the separator 19 and thence to the vortex tube 21 while the second path 35 includes an inlet port 41 for connection to the cold fraction discharge port of the vortex tube 21. An outlet port 43 is provided in the second path 35 for connection to the inlet port of the second compressor 23 and, optionally, to a sensor 45 in parallel therewith.

As described in further detail hereinafter and since the exchanger 17 functions to transfer heat from air flowing in the first path 29 to that flowing in the second path 35, the shape, material and dimensional design parameters of the exchanger 17 should preferably be selected so that air entering the inlet 41 of the second path 35, substantially in a saturated state, is increased to a temperature at its outlet 43 such that the relative humidity of the air flowing from the outlet 43 is less than about 16%.

Compressed air flowing from the outlet 39 of the first path 29 is directed to the inlet of the separator 19 and thence to the inlet of a vortex tube 21 constructed and arranged to divide the compressed air flowing from the outlet 39 into a hot fraction air component flowing in tube 47 and a substantially saturated cold fraction air component flowing in tube 49. A suitable vortex tube 21 is available from, for example, Vortec Corporation of Cincinnati, Ohio, as their Model 106-2H. The aforementioned vortex tube 21 is constructed to incorporate a valve 51 for adjusting the ratios of the hot and cold fraction air components. The vortex tube 21 will preferably be operated in a manner to result in maximum enthalpy or cooling capacity. This will be in the range of 60-70% cold fraction and a cold fraction percentage of about 65% is preferred. Air flowing from the outlet 43 of the second path 35 is directed to the inlet port 53 of the second compressor 23 and its pressure is thereby increased to about 20-25 p.s.i.g., which is a pressure level widely employed in pneumatic control systems of the type described above. Optionally, the apparatus 10 may also include pressure regulating or relief valves 55 at the discharge ports of the first and second compressors 13, 23 and may further include an intake filter 57 and a discharge filter 59 for removing foreign particulate matter from the air stream.

If a degree of automated control is desired, a sensor 45 may be disposed intermediate the outlet 43 of the second path 35 and the inlet port 53 of the second compressor 23 selecting a prescribed relative humidity, dewpoint or air temperature by regulating the amount of hot air exhaust from the vortex tube 21. However, if a higher relative humidity, dewpoint or air temperature is desired, the normally open valve 61 is throttled toward closure.

Figure 4:
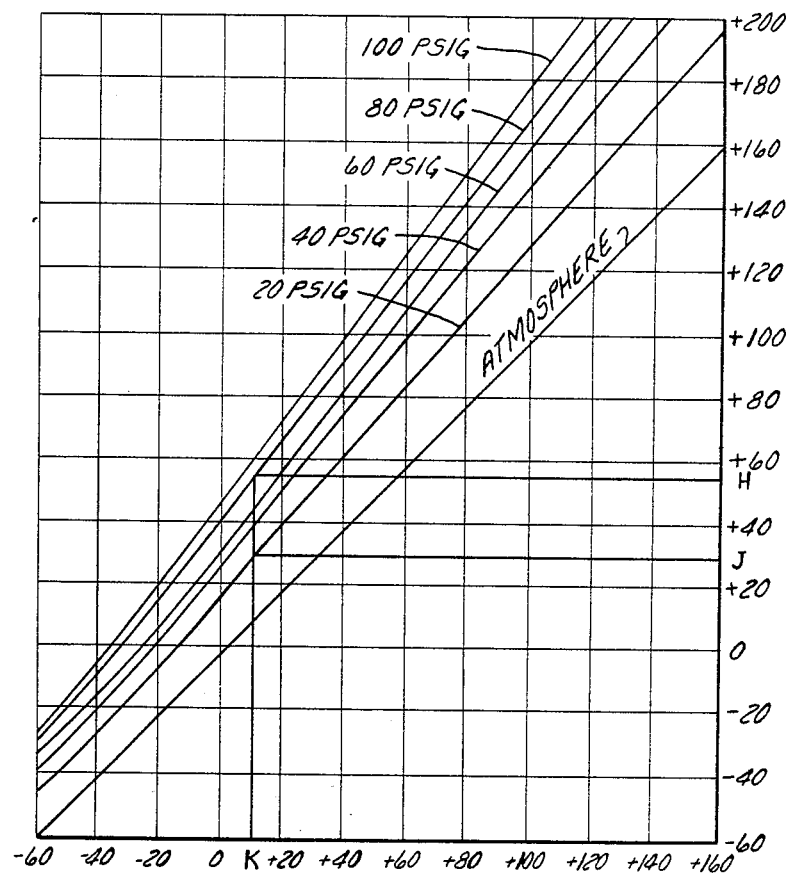
FIG. 4 is a dew point conversion graph useful in understanding the operation of the invention.

Understanding of the inventive apparatus 10 will be aided by reference to FIG. 4 and the following chart which sets forth certain physical parameters characterizing the air at various system points shown in FIG. 3 for a first stage compression of about 82 p.s.i.g. The letters identifying the columnar headings relate to those same designators as shown in FIG. 3. Pressure P is in p.s.i.g., T1 is dewpoint temperature in °F., T2 is dry bulb temperature in °F., RH is relative humidity in percent and W is the weight in pounds of water $\times 10^3$ per pound of dry air.

|    | A    | B   | C   | D   | E   | F   | G   |
|----|------|-----|-----|-----|-----|-----|-----|
| P  | 0    | 82  | 80  | 79  | −1  | −1  | 20  |
| T1 | 60   | 120 | 85  | 55  | 11  | 11  | 28  |
| T2 | 80   | 185 | 85  | 55  | 11  | 55  | 90  |
| RH | 50   | 3   | 100 | 100 | 100 | 16  | 10  |
| W  | 10.9 | 3.9 | 1.4 | 1.4 | 1.4 | 1.4 |     |

The data collected in the foregoing chart is illustrated in FIG. 4, a dewpoint conversion graph known to those skilled in the art, where the abscissa represents dewpoint in °F. at operating pressure and the slightly diverging lines represent selected pressures. If one assumes that the air at point D of FIG. 3 is saturated and is at about 55° F. (intersection of vertical column D and horizontal line T1 in the chart), one may locate the temperature as the ordinate at point H and read horizontally leftward to the intersection with appropriate pressure 80 p.s.i.g. pressure line (79 p.s.i.g. in the chart). The dewpoint at 20 p.s.i.g. may be determined by moving vertically downward to that pressure line and thence rightward horizontally to point J where the latter dewpoint is read to be about 29° F. Similarly, the dewpoint at atmospheric pressure may be determined by moving vertically downward from the aforementioned intersecton to the abscissa at point K where approximately 11° F. may be read.

Referring to the FIGURES and the chart and in operation, air enters the inlet port of the first compressor 13 and in the exemplary embodiment, is compressed to a first pressure which is preferably in the range of from 80 p.s.i.g. to 90 p.s.i.g. This compressed air is then directed to the cooler 15 where it is cooled to a temperature substantially equal to its saturation temperature, i.e., to a temperature resulting in air having a relative humidity of about 100%. The condensate, if any, is extracted from this mixture of saturated air and moisture by the air-water separator 19 continuously or by periodic draining by an automatic drain port 27. This compressed, substantially saturated air then flows through the first path 29 to the inlet of the vortex tube 21 which divides the saturated air into a hot fraction air component for discharge at the hot fraction tube 47 and a cold fraction air component discharged at the cold fraction tube 49. The cold fraction component then flows through a second path 35 disposed in a heat exchange relationship to the first path 29 for warming the cold fraction air component. As noted in the chart, the degree of warming of this cold fraction air component is selected to result in an air temperature at the outlet 43 of the second path 35 such that the relative humidity of that air is about 16% or less. The cold fraction air component flowing from the outlet 43 of the second path 35 is directed to the second compressor 23 where it is compressed to a pressure not in excess of 25 p.s.i.g. The air being discharged from the second compressor 23 will preferably have a post-compression dewpoint below the freezing temperature of water.

It will be noted from reference to the chart that heat removal which occurs in the cooler 15 is substantially isobaric; that is, the pressure at the outlet end 25 of the cooler is substantially equal to that at its inlet end 63. It will also be noted that the warming of the air flowing in the cold fraction tube 49 by the heat exchanger 17 is likewise substantially isobaric in that the pressure at the outlet 43 of the second path 35 is substantially equal to that at its inlet 41. Further, the flow of air from the outlet 39 of the first path 29 through the vortex tube 21 to the outlet 43 of the second path 35 is substantially isothermic in that the temperatures at those outlets 39,43 are substantially equal one to the other.

While only a few embodiments of the inventive apparatus and method have been shown and described herein, the invention is not intended to be limited thereby but only by the scope of the claims which follow.

I claim:

1. An apparatus for providing relatively dry, compressed instrument air and including:
    a first compressor of the oilless type for receiving air at atmospheric temperature and pressure and compressing said air to a first pressure;
    a cooler for receiving and cooling said compressed air;
    a vortex tube for receiving said cooled, compressed air at the inlet thereof and directing cold fraction discharge air to a second compressor;
    a heat exchanger for transferring heat from said cooled, compressed air to said cold fraction discharge air;
    a second compressor of the oilless type for receiving and compressing said cold fraction discharge air, thereby providing a supply of instrument air at a pressure in the range of 15–25 p.s.i.g. and having a dewpoint below the freeing temperature of water, said supply of air provided by said second compressor being in substantially the same quantity, in moles of gas, as that quantity received by said first compressor;
    said first and second compressors being connected to and driven by a common prime mover, said apparatus being of the open loop type and devoid of a return flow path from said second compressor to said first compressor.

* * * * *